US012307230B2

(12) United States Patent
Ishikawa et al.

(10) Patent No.: US 12,307,230 B2
(45) Date of Patent: May 20, 2025

(54) OVER-THE-AIR (OTA) MASTER, CENTER, SYSTEM, METHOD, NON-TRANSITORY STORAGE MEDIUM, AND VEHICLE

(71) Applicant: TOYOTA JIDOSHA KABUSHIKI KAISHA, Toyota (JP)

(72) Inventors: Tomoyasu Ishikawa, Nagoya (JP); Shunsuke Tanimori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 17/729,297

(22) Filed: Apr. 26, 2022

(65) Prior Publication Data

US 2022/0391192 A1 Dec. 8, 2022

(30) Foreign Application Priority Data

Jun. 7, 2021 (JP) ................................. 2021-095070

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
None
See application file for complete search history.

(56) References Cited

U.S. PATENT DOCUMENTS

| 10,282,194 | B2 * | 5/2019 | Martin ..................... H04L 67/10 |
| 10,908,891 | B2 * | 2/2021 | Nakaguma ............. B60R 16/02 |
| 11,693,645 | B2 | 7/2023 | Sakurai et al. |
| 12,039,322 | B2 * | 7/2024 | Ishikawa ................. H04L 67/12 |
| 12,050,903 | B2 * | 7/2024 | Ishikawa ................. H04W 4/40 |
| 2016/0196132 | A1 * | 7/2016 | Searle ....................... G06F 8/65 |
| | | | 717/173 |
| 2019/0050219 | A1 | 2/2019 | Seki |
| 2019/0258476 | A1 * | 8/2019 | Miyazaki ................ G06F 8/658 |
| 2020/0050378 | A1 * | 2/2020 | Sakurai ................. G06F 3/0679 |
| 2021/0157566 | A1 | 5/2021 | Sakurai et al. |

(Continued)

FOREIGN PATENT DOCUMENTS

| CN | 108701064 A | 10/2018 |
| CN | 112585577 A | 3/2021 |

(Continued)

OTHER PUBLICATIONS

U.S. Appl. No. 17/735,488, filed May 3, 2022.

(Continued)

*Primary Examiner* — Marina Lee
(74) *Attorney, Agent, or Firm* — Oliff PLC (57) ABSTRACT

An OTA master configured to control a software update on an electronic control unit mounted on a vehicle includes one or more processors. The one or more processors are configured to receive a second distribution package from a center before a first distribution package. The second distribution package is a distribution package of update data for the electronic control unit with a non-volatile memory of a second type that includes two storage areas. The first distribution package is a distribution package of update data for the electronic control unit with a non-volatile memory of a first type that includes one storage area.

15 Claims, 8 Drawing Sheets

(56) References Cited

U.S. PATENT DOCUMENTS

| | | | |
|---|---|---|---|
| 2021/0157568 A1* | 5/2021 | Sakurai | B60W 60/001 |
| 2022/0391193 A1 | 12/2022 | Ishikawa et al. | |
| 2022/0391194 A1 | 12/2022 | Ishikawa et al. | |
| 2023/0004381 A1* | 1/2023 | Ma | G06F 8/658 |
| 2023/0236822 A1* | 7/2023 | Liu | B60R 16/0231 |

FOREIGN PATENT DOCUMENTS

| | | |
|---|---|---|
| JP | 2004-326689 A | 11/2004 |
| JP | 2015-205555 A | 11/2015 |
| JP | 2020-027624 A | 2/2020 |
| WO | 2020/032195 A1 | 2/2020 |

OTHER PUBLICATIONS

Sep. 12, 2023, Office Action issued in U.S. Appl. No. 17/735,488.
Apr. 19, 2024 Office Action issued in U.S. Appl. No. 17/735,488.
Jan. 11, 2024 Office Action issued in U.S. Appl. No. 17/735,488.
May 22, 2024 Office Action issued in U.S. Appl. No. 17/735,488.
U.S. Pub. cite(s) 2021/0157568A1 cited in the Dec. 7, 2023 Office Action that issued in the present application.
Sep. 30, 2024 Notice of Allowance issued in U.S. Appl. No. 17/735,488.

* cited by examiner

| ECU ID | MEMORY TYPE |
|---|---|
| aaaa | SECOND TYPE (DUAL BANK) |
| bbbb | SECOND TYPE (DUAL BANK) |
| cccc | FIRST TYPE (SINGLE BANK) |
| dddd | FIRST TYPE (SINGLE BANK) |
| ... | ... |

FIG. 8

OVER-THE-AIR (OTA) MASTER, CENTER, SYSTEM, METHOD, NON-TRANSITORY STORAGE MEDIUM, AND VEHICLE

CROSS-REFERENCE TO RELATED APPLICATION

This application claims priority to Japanese Patent Application No. 2021-095070 filed on Jun. 7, 2021, incorporated herein by reference in its entirety.

BACKGROUND

1. Technical Field

The present disclosure relates to an OTA master, a center, a system, a method, a non-transitory storage medium and a vehicle that control software updates on electronic control units.

2. Description of Related Art

A vehicle is equipped with a plurality of electronic control units (ECUs) that controls the operation of the vehicle. The electronic control unit includes a processor, a temporary storage unit such as random access memory (RAM), and a non-volatile memory that is a non-volatile storage unit such as flash read-only memory (ROM). The electronic control unit implements its functions to control electronic control units by the processor executing software stored in the non-volatile memory. The software stored in each electronic control unit is rewritable. Updating the software on the electronic control unit to a newer version of the software can improve the functions of the electronic control unit and add new vehicle control functions.

Over-the-air (OTA) technology is known as a technology for updating software on electronic control units. A device that performs a software update process for the vehicle is wirelessly connected to both an in-vehicle communication device connected to an in-vehicle network and a communication network such as the Internet. The device downloads software from a server via wireless communication and installs the downloaded software in the electronic control unit in order to update software on the electronic control unit or add software to the electronic control unit. See, for example, Japanese Unexamined Patent Application Publication No. 2004-326689 (JP 2004-326689 A).

There are two types of non-volatile memories that are installed in the electronic control unit: memories with one data storage area for storing data such as software (single bank memories), and memories with two data storage areas for storing data such as software (dual bank memories). These types of non-volatile memories are used according to the specifications of the electronic control unit etc. The electronic control unit with a dual bank memory can store two versions of data, namely old and new versions of data, in the two storage areas.

SUMMARY

In a campaign that is a software update event for a vehicle, there may be a case where software on both the electronic control unit with a single bank memory and the electronic control unit with a dual bank memory are to be updated. In this case, when the server combines update data for the electronic control unit with a dual bank memory and update data for the electronic control unit with a single bank memory into one package and sends the package to the device that performs the software update process for the vehicle, a large amount of communication is required to resend the data if a transmission abnormality occurs.

The present disclosure provides an OTA master, center, system, method, non-transitory storage medium, and vehicle that can execute software updates adapted to a single bank memory and a dual bank memory.

In a first aspect of the technique of the present disclosure, an OTA master configured to control a software update on an electronic control unit mounted on a vehicle includes one or more processors. The one or more processors are configured to receive a second distribution package from a center before a first distribution package. The second distribution package is a distribution package of update data for the electronic control unit with a non-volatile memory of a second type. The non-volatile memory of the second type includes two storage areas. The first distribution package is a distribution package of update data for the electronic control unit with a non-volatile memory of a first type. The non-volatile memory of the first type includes one storage area.

In the OTA master according to the first aspect of the technique of the present disclosure, the one or more processors may be configured to transmit information based on the received update data to the electronic control unit to be updated, in accordance with type information that indicates whether the non-volatile memory in the electronic control unit is of the first type or the second type.

In the OTA master according to the first aspect of the technique of the present disclosure, the one or more processors may be configured to acquire the type information from the center.

The OTA master according to the first aspect of the technique of the present disclosure may further include a storage device configured to store the type information.

In the OTA master according to the first aspect of the technique of the present disclosure, the one or more processors may be configured to transmit information based on the update data for the electronic control unit with the non-volatile memory of the second type preferentially over the information based on the update data for the electronic control unit with the non-volatile memory of the first type to the electronic control unit to be updated, in accordance with the type information.

In a second aspect of the technique of the present disclosure, a center configured to communicate with an OTA master configured to control a software update on an electronic control unit mounted on a vehicle includes a storage device configured to store type information that indicates whether a non-volatile memory in the electronic control unit is a non-volatile memory of a first type or a non-volatile memory of a second type. The non-volatile memory of the first type includes one storage area. The non-volatile memory of the second type includes two storage areas.

The center according to the second aspect of the technique of the present disclosure may further include a first communication device configured to send a first distribution package and a second distribution package to the OTA master in accordance with the type information. The first distribution package may be a distribution package of update data for the electronic control unit with the non-volatile memory of the first type. The second distribution package may be a distribution package of update data for the electronic control unit with the non-volatile memory of the second type.

In the center according to the second aspect of the technique of the present disclosure, the first communication device may be configured to send the second distribution package to the OTA master before the first distribution package, in accordance with the type information.

In the center according to the first aspect of the technique of the present disclosure, the first communication device may be configured to send the type information stored in the storage device to the OTA master.

A system in a third aspect of the technique of the present disclosure may include: the center in the second aspect; and the OTA master. The center may include a first communication device configured to send a first distribution package and a second distribution package to the OTA master. The first distribution package may be a distribution package of update data for the electronic control unit with the non-volatile memory of the first type. The second distribution package may be a distribution package of update data for the electronic control unit with the non-volatile memory of the second type. The OTA master may include a second communication device configured to receive the second distribution package before the first distribution package from the center.

In the system according to the third aspect of the technique of the present disclosure, the OTA master may include one or more processors configured to transmit information based on the update data for the electronic control unit with the non-volatile memory of the second type preferentially over information based on the update data for the electronic control unit with the non-volatile memory of the first type to the electronic control unit to be updated, in accordance with the type information.

In the system according to the third aspect of the technique of the present disclosure, the center may include the storage device configured to store the type information. The first communication device of the center may be configured to send the type information to the OTA master.

In a fourth aspect of the technique of the present disclosure, a method is performed by an OTA master that controls a software update on an electronic control unit mounted on a vehicle. The OTA master includes one or more processors and a memory. The method includes receiving a second distribution package from a center before a first distribution package. The second distribution package is a distribution package of update data for the electronic control unit with a non-volatile memory of a second type. The non-volatile memory of the second type includes two storage areas. The first distribution package is a distribution package of update data for the electronic control unit with a non-volatile memory of a first type. The non-volatile memory of the first type includes one storage area.

In a fifth aspect of the technique of the present disclosure, a non-transitory storage medium stores instructions that are executable by a computer of an OTA master that controls a software update on an electronic control unit mounted on a vehicle, and that cause the computer to perform functions. The OTA master includes one or more processors and a memory. The functions include receiving a second distribution package from a center before a first distribution package. The second distribution package is a distribution package of update data for the electronic control unit with a non-volatile memory of a second type. The non-volatile memory of the second type includes two storage areas. The first distribution package is a distribution package of update data for the electronic control unit with a non-volatile memory of the first type. The non-volatile memory of the first type that includes one storage area.

A vehicle may include the OTA master according to the first aspect of the technique of the present disclosure.

According to the OTA master etc. of the present disclosure, when an abnormality occurs in communication of a distribution package, only that distribution package needs to be resent. Therefore, software updates adapted to a single bank memory and a dual bank memory can be executed.

BRIEF DESCRIPTION OF THE DRAWINGS

Features, advantages, and technical and industrial significance of exemplary embodiments of the present disclose will be described below with reference to the accompanying drawings, in which like signs denote like elements, and wherein.

DETAILED DESCRIPTION OF EMBODIMENTS

In a network system of the present disclosure, an OTA master receives a distribution package of update data for an electronic control unit (ECU) with a dual bank memory from the center before receiving a distribution package of update data for an electronic control unit with a single bank memory. Accordingly, when an abnormality occurs in communication of a distribution package, only that distribution package (the distribution package that the abnormality has occurred in communication) needs to be resent, and an increase in amount of communication (communication load) between the center and the OTA master can be reduced.

An embodiment of the present disclosure will be described in detail with reference to the drawings.

Embodiment

Configuration

Figure 1:
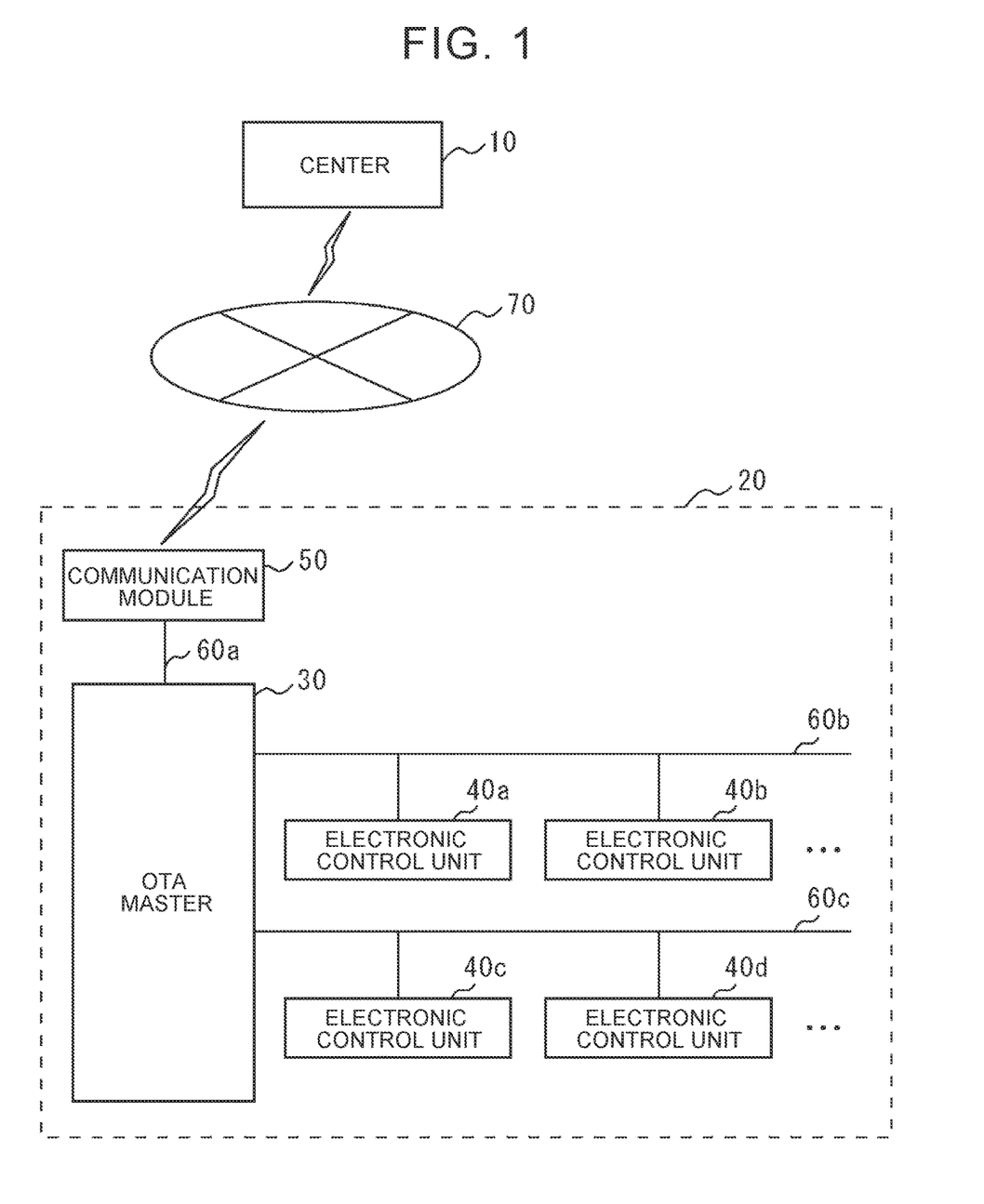
FIG. 1 is a block diagram showing an overall configuration of a network system according to an embodiment.

FIG. 1 is a block diagram showing an overall configuration of a network system according to an embodiment of the present disclosure. The network system shown in FIG. 1 is a system for updating software on a plurality of electronic control units 40a to 40d installed in a vehicle. The network system includes a center 10 outside the vehicle, an in-vehicle network 20 constructed inside the vehicle, and a network 70.

(1) Center

The center 10 can communicate with an OTA master 30 of the in-vehicle network 20 via the network 70. The OTA master 30 will be described later. The center 10 sends software update data for the electronic control units 40a to 40d to the OTA master 30, and receives a notification indicating the progress of a software update process from the OTA master 30. The center 10 can thus control and manage software updates on the electronic control units 40a to 40d connected to the OTA master 30. The center 10 has functions as a so-called server.

Figure 2:
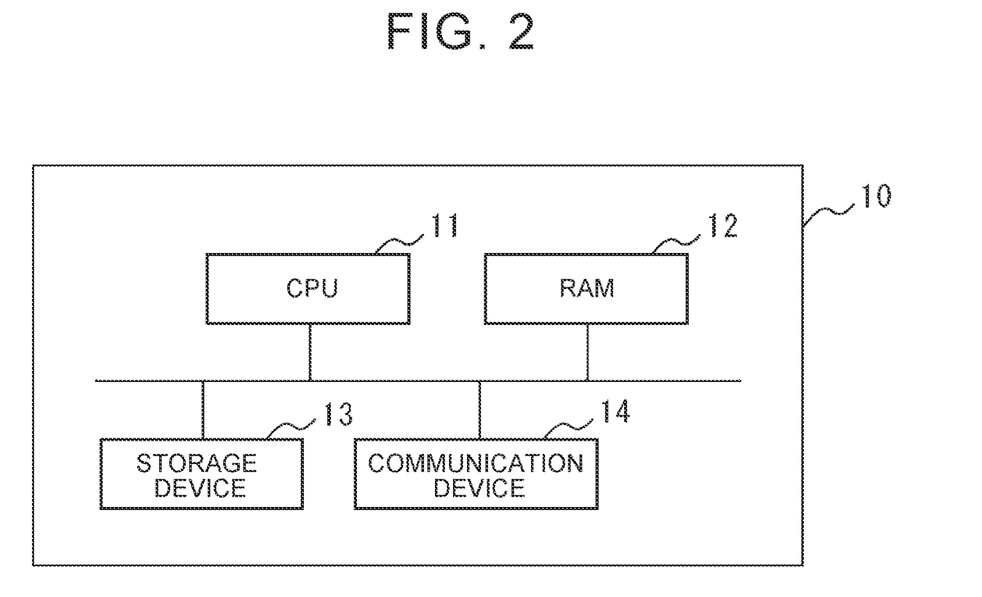
FIG. 2 is a block diagram showing a schematic configuration of a center.

FIG. 2 is a block diagram showing a schematic configuration of the center 10 in FIG. 1. As shown in FIG. 2, the center 10 includes a central processing unit (CPU) 11, a random access memory (RAM) 12, a storage device 13, and a communication device 14. The storage device 13 is a device including a readable and writable storage medium such as a hard disk drive (HDD) or a solid state drive (SSD). The communication device 14 is an example of the "first communication device." For example, the storage device 13 stores programs for performing software update management, information to be used for software update control or software update management, and software update data for each electronic control unit. In the center 10, the CPU 11 executes the programs read from the storage device 13 by using the RAM 12 as a work area to perform a predetermined process related to software update. The communication device 14 is a device for communicating with the OTA master 30 via the network 70.

Figure 3:
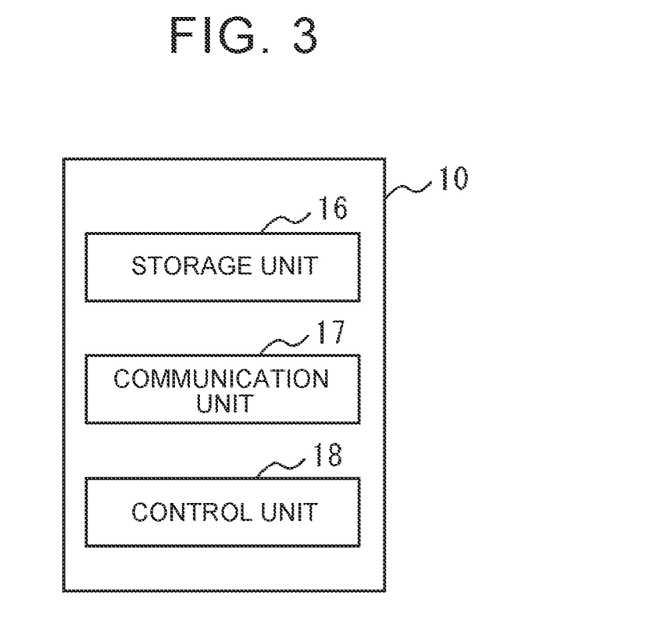
FIG. 3 is a functional block diagram of the center.

FIG. 3 is a functional block diagram of the center 10 shown in FIG. 2. The center 10 shown in FIG. 3 includes a storage unit 16, a communication unit 17, and a control unit 18. The storage unit 16 is implemented by the storage device 13 shown in FIG. 2. The communication unit 17 and the control unit 18 are implemented by the CPU 11 in FIG. 2 executing the programs stored in the storage device 13 by using the RAM 12.

The storage unit 16 stores information on the software update process for one or more electronic control units installed in the vehicle. As the information on the software update process, the storage unit 16 stores at least update management information and software update data for the electronic control units 40a to 40d. The update management information is information in which information indicating software available for the electronic control units 40a to 40d is associated with vehicle identification information (vehicle ID) identifying the vehicle. The information indicating software available for the electronic control units 40a to 40d include, for example, a combination of pieces of latest version information of software for the electronic control units 40a to 40d. As the information on the software update process, the storage unit 16 can also store an update status of the software update being performed in the vehicle. The storage unit 16 can further store information (described later) on the type of non-volatile memory in each of the electronic control units 40a to 40d.

The communication unit 17 functions as a transmission unit and reception unit that send and receive data, information, requests, etc. to and from the OTA master 30. The communication unit 17 receives a software update check request from the OTA master 30 (reception unit). For example, the update check request is information to be sent from the OTA master 30 to the center 10 when the power or ignition of the vehicle is turned on (hereinafter referred to as "powered ON"). The update check request is information requesting the center 10 to check whether there is update data for the electronic control units 40a to 40d based on vehicle configuration information described later. In response to the update check request received from the OTA master 30, the communication unit 17 sends information indicating whether there is update data to the OTA master 30 (transmission unit). The communication unit 17 also receives a distribution package transmission request (download request) from the OTA master 30 (reception unit). In response to the distribution package download request, the communication unit 17 sends, to the OTA master 30, a distribution package of the software update data for the electronic control units 40a to 40d generated by the control unit 18 described later. The communication unit 17 is an example of the "first communication unit."

When the communication unit 17 receives the update check request from the OTA master 30, the control unit 18 determines whether there is software update data for the electronic control units 40a to 40d installed in the vehicle identified by the vehicle ID included in the update check request, based on the update management information stored in the storage unit 16. The result of the determination of the control unit 18 as to whether there is update data is sent to the OTA master 30 via the communication unit 17. When the control unit 18 determines that there is software update data for the electronic control units 40a to 40d and receives a distribution package download request from the OTA master 30, the control unit 18 generates a distribution package of the update data stored in the storage unit 16.

The control unit 18 separately generates a distribution package of only the update data for an electronic control unit with a single bank memory, and a distribution package of only the update data for an electronic control unit with a dual bank memory. The single bank memory and the dual bank memory will be described later. The distribution package of only the update data for an electronic control unit with a single bank memory is an example of the "first distribution package." The distribution package of only the update data for an electronic control unit with a dual bank memory is an example of the "second distribution package." When type information described later is stored in advance in the storage unit 16, the control unit 18 can intentionally and separately generate distribution packages of update data of different types. By separately generating the distribution packages of update data based on the type, (the communication unit 17 of) the center 10 can send the distribution package of update data for the electronic control unit with the non-volatile memory of the second type to the OTA master 30 before sending the distribution package of update data for the electronic control unit with the non-volatile memory of the first type.

(2) In-Vehicle Network

The in-vehicle network 20 includes the OTA master 30, the electronic control units 40a to 40d, and a communication module 50. The OTA master 30 and the communication module 50 are connected via a bus 60a. The OTA master 30 and the electronic control units 40a and 40b are connected via a bus 60b. The OTA master 30 and the electronic control units 40c and 40d are connected via a bus 60c.

The OTA master 30 can communicate wirelessly with the center 10 via the network 70 through the bus 60a and the communication module 50. The OTA master 30 manages the OTA state. The OTA master 30 has a function to control an update sequence that is a flow of the software update process and perform a software update on an electronic control unit whose software is to be updated (hereinafter referred to as "target electronic control unit"). The OTA master 30 controls the software update on the target electronic control unit based on, for example, the update data acquired from the center 10. The target electronic control unit is an electronic control unit whose software is to be updated, out of the electronic control units 40a to 40d. One or more target electronic control units may function as the OTA master 30. The OTA master 30 is sometimes referred to as "central gateway (CGW)."

Figure 4:
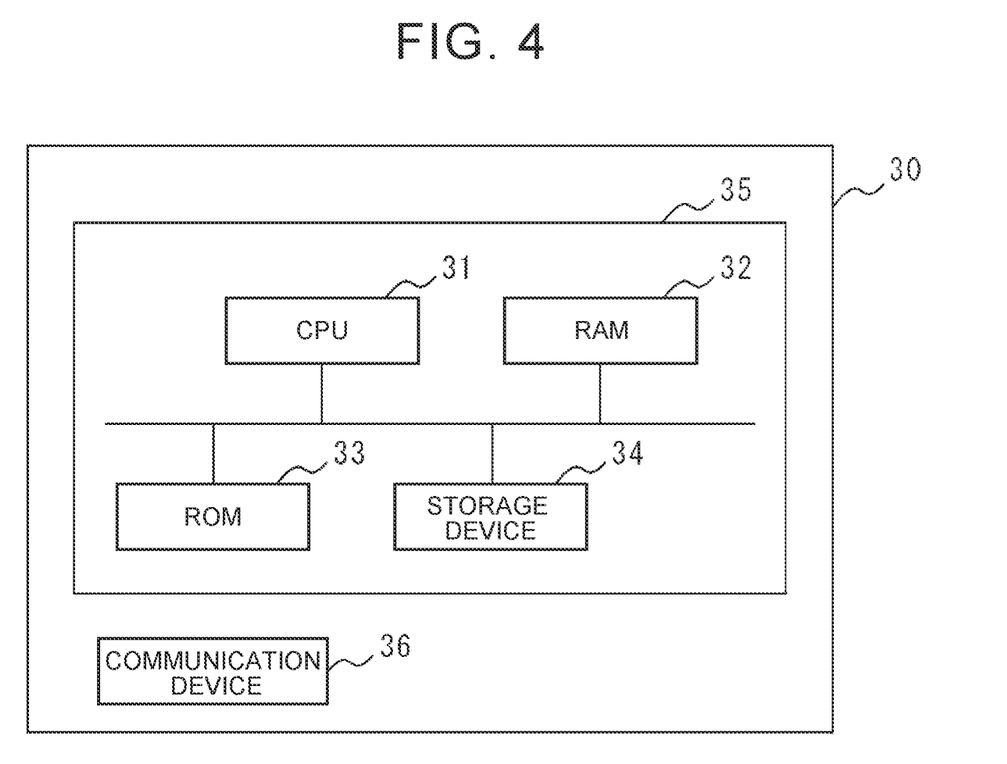
FIG. 4 is a block diagram showing a schematic configuration of an OTA master.

FIG. 4 is a block diagram showing a schematic configuration of the OTA master 30 in FIG. 1. As shown in FIG. 4, the OTA master 30 includes a microcomputer 35 and a communication device 36. The microcomputer 35 includes a CPU 31, a RAM 32, a ROM 33, and a storage device 34. In the OTA master 30, the CPU 31 executes programs read from the ROM 33 by using the RAM 32 as a work area to perform a predetermined process related to software update. The communication device 36 communicates with the communication module 50 and the electronic control units 40a to 40d via the buses 60a to 60c shown in FIG. 1. The communication device 36 is an example of the "second communication device."

Figure 5:
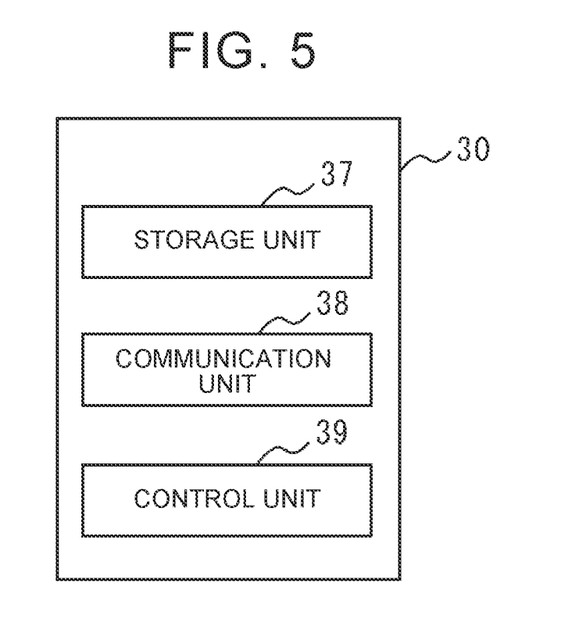
FIG. 5 is a functional block diagram of the OTA master.

FIG. 5 is a functional block diagram of the OTA master 30 shown in FIG. 4. The OTA master 30 shown in FIG. 5 includes a storage unit 37, a communication unit 38, and a control unit 39. The storage unit 37 is implemented by the storage device 34 shown in FIG. 4. The communication unit 38 and the control unit 39 are implemented by the CPU 31 in FIG. 4 executing programs stored in the ROM 33 by using the RAM 32.

The storage unit 37 stores, for example, a program for performing software updates on the electronic control units 40a to 40d (control program for the OTA master 30), various kinds of data to be used when performing the software updates, and software update data downloaded from the center 10. The storage unit 37 can further store information (described later) on the type of non-volatile memory in each of the electronic control units 40a to 40d.

The communication unit 38 functions as a transmission unit and reception unit that send and receive data, information, requests, etc. to and from the center 10. For example, the communication unit 38 sends a software update check request to the center 10 when the vehicle is powered ON (transmission unit). For example, the update check request includes the vehicle ID identifying the vehicle, and information on the current versions of software on the electronic control units 40a to 40d connected to the in-vehicle network 20. The vehicle ID and the current versions of software on the electronic control units 40a to 40d are used to determine whether there is software update data for the electronic control units 40a to 40d by making comparison with the latest versions of software held in the center 10 for each vehicle ID. The communication unit 38 receives a notification indicating whether there is update data from the center 10 as a response to the update check request (reception unit). When there is software update data for the electronic control units 40a to 40d, the communication unit 38 sends a download request for a distribution package of the software update data to the center 10 (transmission unit). The communication unit 38 receives (downloads) the distribution package sent from the center 10 (reception unit). The communication unit 38 sends software update statuses received from the electronic control units 40a to 40d to the center 10 (transmission unit). The communication unit 38 is an example of the "second communication unit."

The control unit 39 determines whether there is software update data for the electronic control units 40a to 40d based on the response to the update check request received by the communication unit 38 from the center 10. The control unit 39 also verifies authenticity of the distribution package received (downloaded) by the communication unit 38 from the center 10 and stored in the storage unit 37. The control unit 39 also controls the software update process (various kinds of verification, installation, activation, etc.) for the electronic control units 40a to 40d by using the update data received (downloaded) from the center 10. Specifically, the control unit 39 transfers one or more pieces of update data downloaded in the distribution package to the target electronic control unit. The control unit 39 then causes the target electronic control unit to install the update software based on the update data. After the installation is completed, the control unit 39 instructs the target electronic control unit to activate (enable) the installed update software. In this software update process, the control unit 39 suitably controls procedures such as various kinds of verification, installation, and activation in the electronic control units 40a to 40d.

The electronic control units 40a to 40d control the operation of various parts of the vehicle. Although FIG. 1 shows an example in which the in-vehicle network 20 includes four electronic control units 40a to 40d, the number of electronic control units is not particularly limited. A display device (human-machine interface (HMI)) for displaying various indications, such as an indication that there is update data, an accept request screen requesting a user or administrator of the vehicle to accept a software update, and an software update result, during the software update process for the electronic control units 40a to 40d may be connected to the OTA master 30. An automotive navigation system etc. can be used as the display device. The number of buses connecting the electronic control units to the OTA master 30 is also not particularly limited. For example, the display device may be connected to the OTA master 30 via a bus other than the buses 60a to 60c.

Figure 6A:
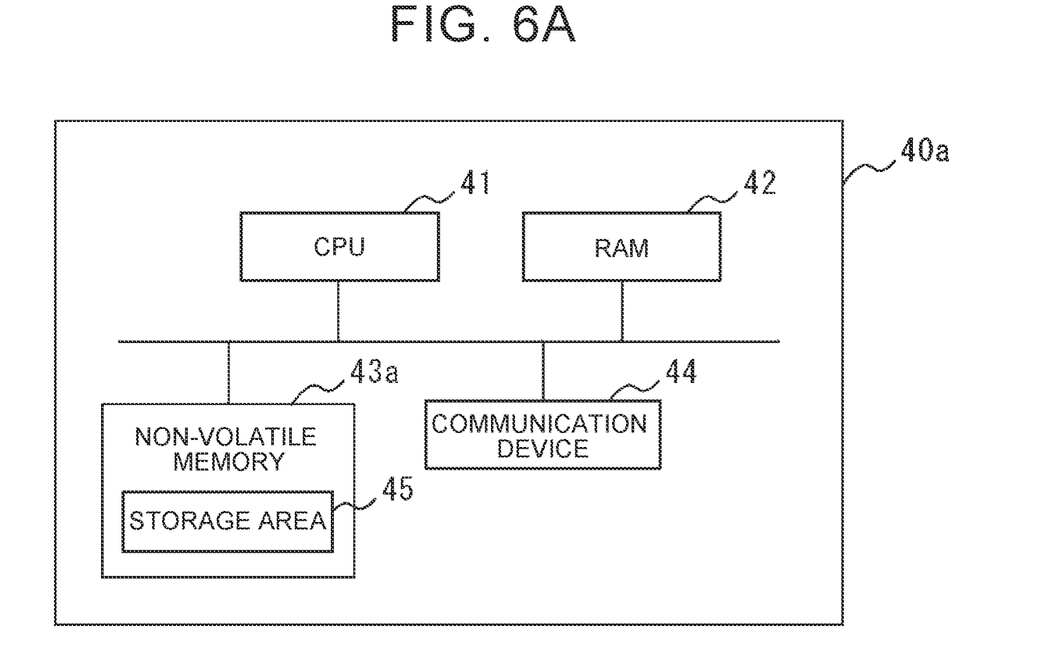
FIG. 6A is a block diagram showing an example of a schematic configuration of an electronic control unit.
Figure 6B:
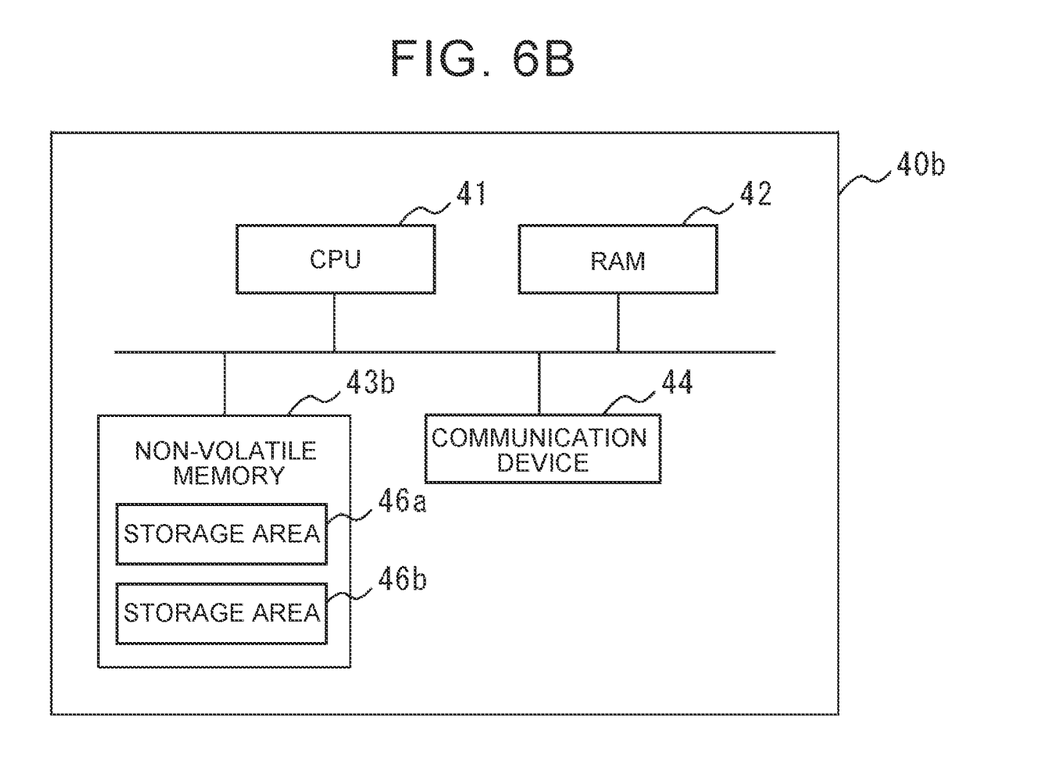
FIG. 6B is a block diagram showing an example of a schematic configuration of an electronic control unit.

An example of the schematic configuration of the electronic control units 40a to 40d is shown in FIGS. 6A and 6B.

The electronic control unit 40a shown in FIG. 6A includes a CPU 41, a RAM 42, a non-volatile memory 43a, and a communication device 44. The CPU 41 implements functions of the electronic control unit 40a by executing programs read from the non-volatile memory 43a by using the RAM 42 as a work area. The non-volatile memory 43a includes one storage area 45 for storing data such as software (hereinafter referred to as "single bank memory"). Hereinafter, the type of the non-volatile memory 43a with one storage area 45 is referred to as "first type." In addition to the software for implementing the functions of the electronic control unit 40a, version information, parameter data, a boot program for booting, a program for software update, etc. may be stored in the storage area 45. The communication device 44 communicates with the OTA master 30 and the other electronic control units 40b to 40d connected to the in-vehicle network 20.

Like the electronic control unit 40a, the electronic control unit 40b shown in FIG. 6B includes a CPU 41, a RAM 42, a non-volatile memory 43b, and a communication device 44. However, the non-volatile memory 43b installed in the electronic control unit 40b includes two storage areas 46a and 46b for storing data such as software (hereinafter referred to as "dual bank memory"). Hereinafter, the type of the non-volatile memory 43b with two storage areas 46a and 46b is referred to as "second type." In addition to the software for implementing the functions of the electronic control unit 40b, version information, parameter data, a boot program for booting, a program for software update, etc. may be stored in the storage areas 46a and 46b. The CPU 41 of the electronic control unit 40b uses one of the two storage areas 46a and 46b of the non-volatile memory 43b as a storage area to be read (active bank). The CPU 41 of the electronic control unit 40b executes software stored in the storage area to be read. During execution of the software (program) stored in the storage area to be read (active bank), update software (updated version of program) based on update data can be installed (written) in the background in the other data storage area not to be read (inactive bank). For activation in the software update process (activation of the update software), the CPU 41 of the electronic control unit 40b can activate the update software by switching the storage area from which the program is to be read.

As a specific example, it is assumed that the current version of software is stored in the storage area 46a of the non-volatile memory 43b that is a dual bank memory and update software has been installed in the storage area 46b. For example, when the OTA master 30 instructs the electronic control unit 40b to activate the update software, the electronic control unit 40b switches the read start address of the CPU 41 from the top address of the storage area 46a to the top address of the storage area 46b to switch the storage area to be read (active bank) by the CPU 41. The electronic control unit 40b can thus execute the update software installed in the storage area 46b. In the present disclosure, a configuration called a "single-sided suspend memory" in which one storage area is pseudo-divided into two sides so that a program can be written to the other side while a program stored in one side is being executed also belongs to the second type of memory.

Figure 7:
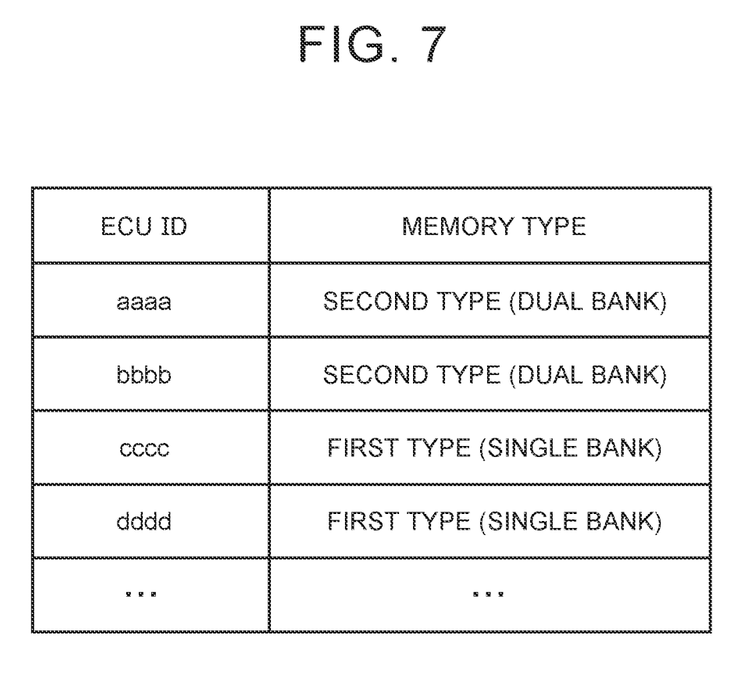
FIG. 7 shows an example of type information.

FIG. 7 shows an example of the type information that is information on the type of non-volatile memory in each of the electronic control units 40a to 40d. In the type information illustrated in FIG. 7, ECU ID that is a number for identifying the electronic control unit is associated with the type of non-volatile memory in the electronic control unit (first type (single bank) or second type (dual bank)). The type information is stored and managed in at least one of the storage unit 37 of the OTA master 30 and the storage unit 16 of the center 10. The type information may be created in advance based on the specifications of the electronic control units 40a to 40d of the in-vehicle network 20 and may be stored in the storage unit 37 of the OTA master 30 at the time of manufacturing the vehicle etc. The OTA master 30 may acquire the type information from the target electronic control unit via communication in the in-vehicle network 20 during the software update process. When the center 10 manages the type information, the OTA master 30 may acquire the type information from the center 10 via the network 70.

The communication module 50 is a unit having a function to control communication between the center 10 and the vehicle. The communication module 50 connects the in-vehicle network 20 to the center 10. The communication module 50 is wirelessly connected to the center 10 via the network 70. The OTA master 30 authenticates the vehicle, download update data, etc. via the communication module 50. The communication module 50 may be included in the OTA master 30.

Overview of Software Update Process

For example, the OTA master 30 sends a software update check request to the center 10 when the vehicle is powered ON. The update check request includes the vehicle ID identifying the vehicle, and the vehicle configuration information. The vehicle configuration information is information on the state of the electronic control units (system configuration), such as hardware and current versions of software of the electronic control units 40a to 40d connected to the in-vehicle network 20. The vehicle configuration information can be created by acquiring identification numbers of the electronic control units (ECU IDs) and identification numbers of the versions of software on the electronic control units (ECU_Software_IDs) from the electronic control units 40a to 40d connected to the in-vehicle network 20. The center 10 determines whether there is software update data for the electronic control units 40a to 40d by comparing the vehicle ID and the current versions of software on the electronic control units 40a to 40d with the latest versions of software held in the center 10 for each vehicle ID. In response to the update check request received from the OTA master 30, the center 10 sends a notification indicating whether there is update data to the OTA master 30. When there is software update data for the electronic control units 40a to 40d, the OTA master 30 sends a distribution package download request to the center 10. In response to the download request received from the OTA master 30, the center 10 sends a distribution package of the update data to the OTA master 30. The distribution package may include, in addition to the update data, verification data for verifying the authenticity of the update data, the number of pieces of the update data, the type information, various kinds of control information to be used during software update, etc.

The OTA master 30 determines whether there is software update data for the electronic control units 40a to 40d based on the response to the update check request received from the center 10. The OTA master 30 verifies the authenticity of the distribution package received from the center 10 and stored in the storage device 13. The OTA master 30 transfers one or more pieces of update data downloaded as the distribution package to the target electronic control unit, and causes the target electronic control unit to install the update data. After the installation is completed, the OTA master 30 instructs the target electronic control unit to activate the installed updated version of software.

In an accept request process, the OTA master 30 causes an output device to output a notification that the software update needs to be accepted and a notification prompting for input accepting the software update. Examples of the output device include a display device (not shown) that is provided in the in-vehicle network 20 and that provides notifications by display, and an audio output device (not shown) that provides notifications by audio. For example, when the display device is used as the output device in the accept request process, the OTA master 30 can cause the display device to display an accept request screen requesting the user or administrator to accept the software update, and to display a notification prompting the user or administrator to perform a specific input operation such as pressing of an accept button when accepting the software update. In the accept request process, the OTA master 30 can cause the display device to display texts, icons, etc. notifying that there is software update data for the electronic control units 40a to 40d, and to display restrictions to be imposed during the software update process. In response to the input accepting the software update from the user or administrator, the OTA master 30 performs a control process for the installation and activation to update the software on the target electronic control unit.

When the non-volatile memory of the target electronic control unit is a single bank memory, the installation and activation are performed in principle in succession. Therefore, the accept request process for the software update is performed before the installation. Even when the non-volatile memory of the target electronic control unit is a single bank memory, the target electronic control unit may be required to temporarily stop the update process, that is, to wait for (hold) activation, when the installation is completed. When the non-volatile memory of the electronic control unit is a dual bank memory, the accept request process for the software update is performed at least after the installation and before the activation. When the non-volatile memory of the electronic control unit is a dual bank memory, the accept request process for the software update before the installation may be performed or omitted.

The software update process includes a download phase, an installation phase, and an activation phase. In the download phase, the OTA master 30 downloads update data from the center 10. In the installation phase, the OTA master 30 transfers the downloaded update data (update software) to the target electronic control unit and installs update software based on the update data in the storage area of the target electronic control unit. In the activation phase, the target electronic control unit activates the installed update software.

Download is a process in which the OTA master 30 receives update data sent as a distribution package from the center 10 and stores the received update data in the storage unit 37. The update data is data for updating software on the electronic control unit. For the download, reception of update data for the electronic control unit with a dual bank memory for which the probability of update failure is relatively low precedes reception of update data for the electronic control unit with a single bank memory. The download phase includes not only execution of download but also control of a series of processes related to the download, such as determination as to whether the download can be executed and verification of the update data.

The update data sent from the center 10 to the OTA master 30 may include any of the following: update software for the electronic control unit (all data or differential data), compressed data of the update software, and divided data of the update software or the compressed data. The update data may include an ECU ID (or serial number) of the target electronic control unit and an ECU_Software_ID of the electronic control unit before update. The update data is downloaded as the distribution package. The distribution package includes update data for one or more electronic control units.

Installation is a process in which the OTA master 30 writes update software (updated version of program) to the non-volatile memories 43a and/or 43b of the plurality of target electronic control units in a predetermined order based on the update data downloaded from the center 10. Installation of the update data for the electronic control unit with a dual bank memory is executed preferentially over installation of the update data for the electronic control unit with a single bank memory. The installation phase includes not only execution of installation but also control of a series of processes related to the installation, such as determination as to whether the installation can be executed, transfer of the update data, and verification of the update software.

When the update data includes the update software (all data), the OTA master 30 transfers the update data (update software) to the target electronic control unit in the installation phase. When the update data includes compressed data of the update software, difference data, or divided data, the OTA master 30 may transfer the update data to the target electronic control unit, and the target electronic control unit may generate the update software from the update data. Alternatively, the OTA master 30 may generate the update software from the update data and then transfer the update software to the target electronic control unit. The update software can be generated by decompressing the compressed data or assembling (integrating) the difference data or the divided data. The update data and the update software are examples of the "information based on an update data."

Installation of the update software can be executed by the target electronic control unit based on an installation request from the OTA master 30. A specific target electronic control unit that has received the update data may autonomously execute the installation without receiving an explicit instruction from the OTA master 30.

Activation is a process in which the target electronic control unit activates the update software installed in the non-volatile memory 43a and/or 43b. For the activation, either activation of the update data for the electronic control unit with a dual bank memory or activation of the update data for the electronic control unit with a single bank memory may be executed preferentially over the other. Alternatively, the activation of the update data for the electronic control unit with a dual bank memory and the activation of the update data for the electronic control unit with a single bank memory may be executed without priority of one activation over the other. The activation phase includes not only execution of activation but also a series of controls related to the activation, such as determination as to whether the activation can be executed, a request for the user or administrator of the vehicle to accept the activation, and verification of execution results.

Activation of the update software can be executed by the target electronic control unit based on an activation request from the OTA master 30. A specific target electronic control unit that has received the update data may autonomously execute the activation after completion of the installation without receiving an explicit instruction from the OTA master 30.

The software update process can be performed successively or in parallel for the target electronic control units.

The "software update process" includes not only a process of successively executing all of the download, installation, and activation, but also a process of executing only a part of the download, installation, and activation.

Processes

Next, some specific examples of the software update process that is performed in the network system according to the present embodiment will be described with further reference to FIGS. 8, 9, and 10.

(1) Specific Example of Download

Figure 8:
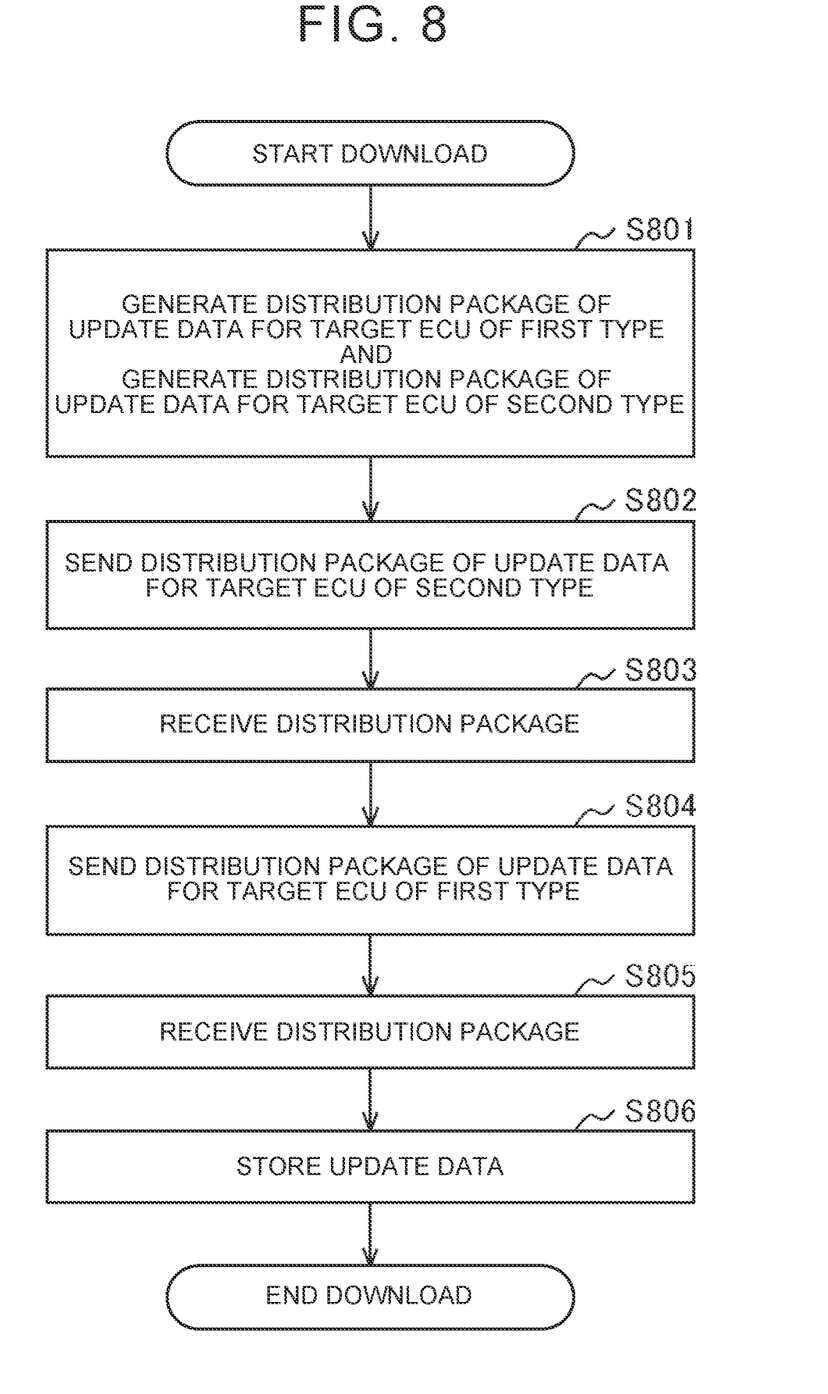
FIG. 8 shows an example of a flowchart of a download process procedure that is performed by the center and the OTA master.

FIG. 8 is a flowchart illustrating a processing procedure according to a specific example of the download that is executed by the center 10 and the OTA master 30. The download process illustrated in FIG. 8 is started when the center 10 receives a distribution package download request from the OTA master 30.

Step S801

Hereinafter, the ECUs whose software is to be updated are referred to as "target ECUs". The center 10 generates a distribution package of update data for the target ECU with the non-volatile memory of the first type (hereinafter referred to as "a target ECU of the first type") out of the target ECUs. The center 10 also generates a distribution package of update data for the target ECU with the non-volatile memory of the second type (hereinafter referred to as "a target ECU of the second type") out of the target ECUs. At this time, the center 10 can determine the type of the non-volatile memory in the target ECU by referring to the type information stored in the storage unit 16. When the center 10 manages the types of non-volatile memories in the electronic control units 40a to 40d, information on the memory type may be included in the distribution package. When the distribution packages of update data for the target ECU of the first type and the distribution packages of update data for the target ECU of the second type are generated, the routine proceeds to step S802.

Step S802

The center 10 sends the distribution package of update data for the target ECU of the second type to the OTA master 30. When the distribution package is sent, the routine proceeds to step S803.

Step S803

The OTA master 30 receives the distribution package of update data for the target ECU of the second type sent from the center 10. When the reception of this distribution package is completed, the routine proceeds to step S804.

Step S804

The center 10 sends the distribution package of update data for the target ECU of the first type to the OTA master 30. When the distribution package is sent, the routine proceeds to step S805.

Step S805

The OTA master 30 receives the distribution package of update data for the target ECU of the first type sent from the center 10. When the reception of this distribution package is completed, the routine proceeds to step S806.

Step S806

The OTA master 30 stores the update data (and the information on the memory type etc.) received as the distribution packages from the center 10 in the storage unit 37. The download process thus ends.

With this specific example of the download, the OTA master 30 can receive the distribution package of update data for the target ECU of the second type before the distribution package of update data for the target ECU of the first type.

(2) Specific Example of Installation

Figure 9:
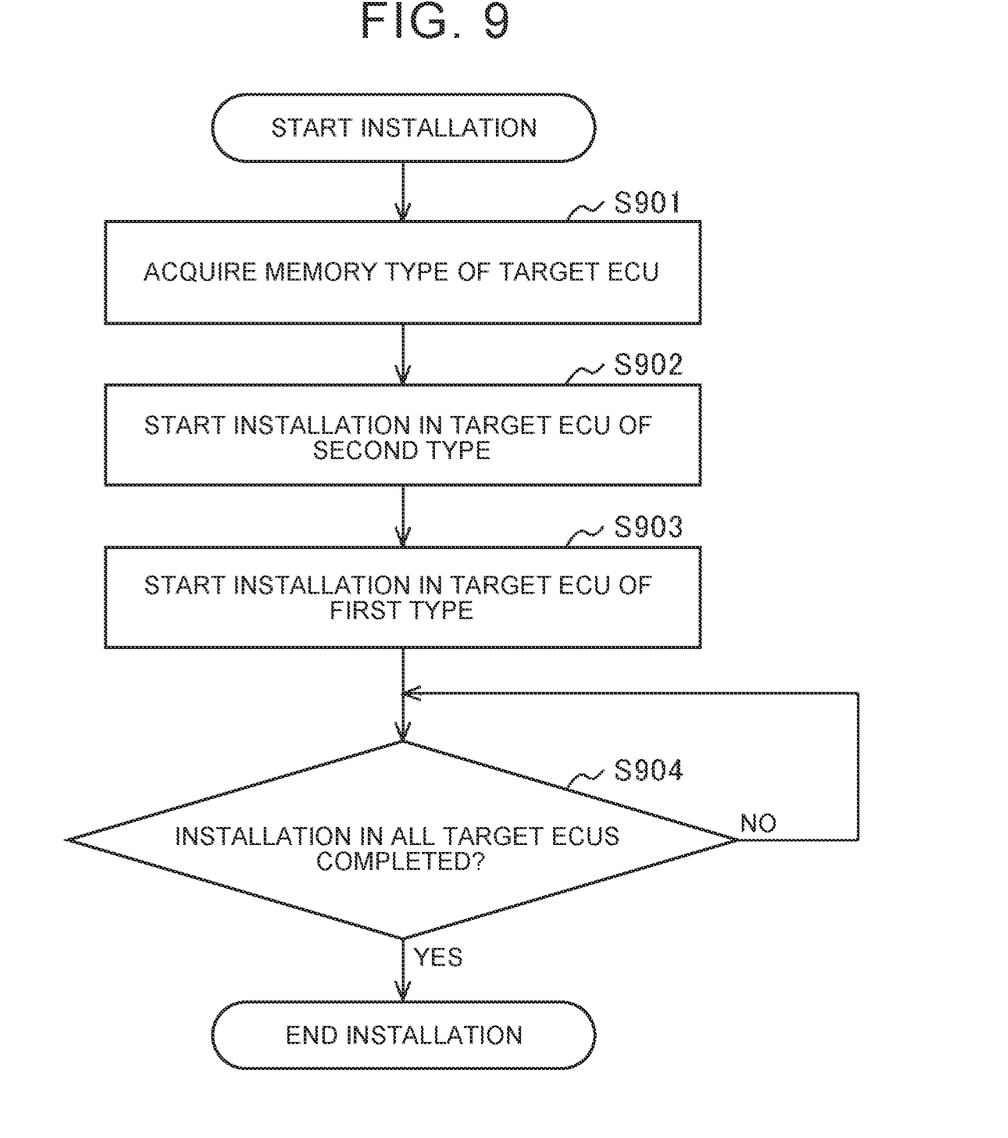
FIG. 9 shows an example of a flowchart of an installation process procedure that is performed by the OTA master and a target electronic control unit.

FIG. 9 is a flowchart illustrating a processing procedure according to a specific example of the installation that is executed by the OTA master 30 and the target ECU. The specific example of the installation illustrated in FIG. 9 is started after the download of the update data for at least one target ECU of the second type is completed and when predetermined conditions are satisfied (it is determined that installation can be executed, the verification result of the update data is good, etc.).

Step S901

The OTA master 30 acquires the type (first type or second type) of the non-volatile memory in the target ECU. When the OTA master 30 manages the memory types, the OTA master 30 can acquire the memory type of this target ECU by referring to the type information (FIG. 7) stored in the storage unit 37. When the center 10 manages the memory types, the OTA master 30 can acquire the memory type of this target ECU by referring to the information on the memory type included in the received distribution package. When the memory type of the target ECU is acquired, the routine proceeds to step S902.

Step S902

The OTA master 30 and the target ECU of the second type start installation, namely a process of writing update software to the storage area of the non-volatile memory of the target ECU of the second type based on the update data. This installation is started all at once or in a predetermined order in all the target ECUs of the second type. When the installation in the target ECU of the second type is started, the routine proceeds to step S903.

Step S903

The OTA master 30 and the target ECU of the first type start installation, namely a process of writing update software to the storage area of the non-volatile memory of the target ECU of the first type based on the update data. This installation is started all at once or in a predetermined order in all the target ECUs of the first type. The installation in the target ECU of the first type may be started after the installation in all the target ECUs of the second type is completed, or may be started after the installation in a predetermined part of the target ECUs of the second type is completed. When the installation in the target ECU of the first type is started, the routine proceeds to step S904.

Step S904

The OTA master 30 determines whether the installation of the update software in all the target ECUs (first type and second type) is completed. The OTA master 30 may determine that the installation of the update software in all the target ECUs is completed when the OTA master 30 receives a completion notification from each target ECU. Alternatively, the OTA master 30 may determine that the installation of the update software in all the target ECUs is completed when predetermined time has passed since the start of the installation. For example, the predetermined time can be set to a value equal to or greater than the maximum time required for the installation in all the target ECUs. When the OTA master 30 determines that the installation of the update software in all the target ECUs is completed (step S904, YES), the installation in the target ECUs is completed, and the installation process ends.

With this specific example of the installation, the installation in the target ECU of the second type that does not require stop control during the update can be started preferentially over the installation in the target ECU of the first type that requires the stop control during the update. This process can reduce the communication load in the vehicle (in-vehicle network 20). This process can also reduce the amount of time during which control of the vehicle needs to be stopped by the time the writing of the update software to all the target ECUs is completed.

(3) Specific Example of Activation

Figure 10:
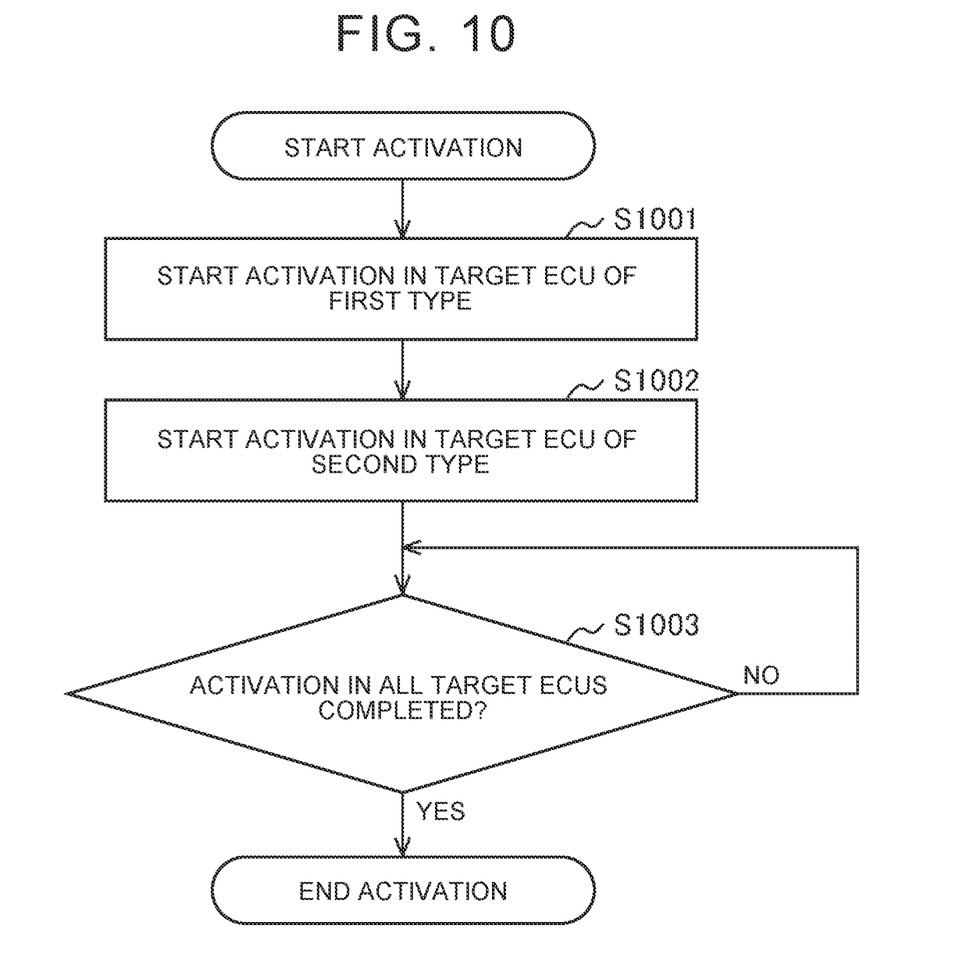
FIG. 10 shows an example of a flowchart of an activation process procedure that is performed by the OTA master and the target electronic control unit.

FIG. 10 is a flowchart illustrating a processing procedure according to a specific example of the activation that is executed by the OTA master 30 and the target ECU. The activation process illustrated in FIG. 10 is started after the installation of the update software in the target ECUs of the first and second types is completed and when predetermined conditions are satisfied (it is determined that activation can be executed, the verification result of the update data is good, etc.).

Step S1001

The target ECU of the first type starts activation of the update software written in the storage area of the non-volatile memory of the target ECU of the first type. This activation is started all at once or in a predetermined order for all the target ECUs of the first type. When the activation of the update software in the target ECU of the first type is started, the routine proceeds to step S1002.

Step S1002

The target ECU of the second type starts activation of the update software written in the storage area of non-volatile memory of the target ECU of the second type. This activation is started all at once or in a predetermined order for all the target ECUs of the second type. The activation in the target ECU of the second type may be started after the activation in all the target ECUs of the first type is completed. The activation in the target ECU of the second type may be started after the activation in a predetermined part of the target ECUs of the first type is completed. When the activation of the update software in the target ECU of the second type is started, the routine proceeds to step S1003.

Step S1003

The OTA master 30 determines whether the activation of the update software in all the target ECUs (first type and second type) is completed. The OTA master 30 may determine that the activation of the update software in all the target ECUs is completed when the OTA master 30 receives a completion notification from each target ECU. Alternatively, the OTA master 30 may determine that the activation of the update software in all the target ECUs is completed when predetermined time has passed since the start of the activation. For example, the predetermined time can be set to a value equal to or greater than the maximum time required for the activation in all the target ECUs. When the OTA master 30 determines that the activation of the update software in all the target ECUs is completed (step S1003, YES), the activation in the target ECUs is completed, and the activation process ends. When the OTA master 30 determines that the activation of the update software in a part of the target ECUs is not completed (step S1003, NO), step S1003 is repeated.

According to the specific example of the activation, the activation of the update software in the target ECU of the first type is started first, and then the activation of the update software in the target ECU of the second type is started. By this process, the software update of the target ECU of the second type can be executed after confirming the success of the software update in the target ECU of the first type. Accordingly, the software update process for the system including both a target ECU with a single bank memory and a target ECU with a dual bank memory can be suitably performed.

Operations and Effects

As described above, according to the network system of the embodiment of the present disclosure, update data for an electronic control unit with a single bank memory (non-volatile memory of first type) and update data for an electronic control unit with a dual bank memory (non-volatile memory of second type) are generated as separate distribution packages. The center sends the distribution package of the update data for the electronic control unit with a dual bank memory to the OTA master before the distribution package of the update data for the electronic control unit with a single bank memory.

With this process, when an abnormality occurs in communication of a distribution package, only that distribution package (the distribution package that the abnormality has occurred in communication) needs to be resent. This configuration can reduce an increase in amount of communication (communication load) between the center and the OTA master. Moreover, the center can send the update data in the form of a distribution package after validating software integrity. It is therefore possible to avoid a situation in which the OTA master finds update data inconsistent after downloading the update data and sends a resend request to the center.

The OTA master can receive the distribution package of the update data for the electronic control unit with a dual bank memory before the distribution package of the update data for the electronic control unit with a single bank memory. The OTA master can therefore execute the installation in the target electronic control unit with a dual bank memory that does not require the stop control during update preferentially over the installation in the target electronic control unit with a single bank memory that requires the stop control during update.

Accordingly, the OTA master can first write the update software to the storage area of the target electronic control unit with a dual bank memory, and start writing the update software in the storage area of the target electronic control unit with a single bank memory when the writing of the update software to the storage area of the target electronic control unit with a dual bank memory is about to be completed. This configuration can reduce the communication load in the vehicle (in-vehicle network). This configuration can therefore reduce the amount of time during which control of the vehicle needs to be stopped by the time the writing of the update software to all the target ECUs is completed.

Although one embodiment of the technique of the present disclosure is described above, the present disclosure can be interpreted not only as an OTA master but also as a method that is performed by an OTA master including a processor and a memory, programs, a computer-readable non-transitory storage medium storing programs, a center capable of communicating with the OTA master, a system including a center and an OTA master, a vehicle including an OTA master, etc. The center may include one or more processors. The OTA master may include one or more processors.

The technique of the present disclosure can be used in a network system for updating software on an electronic control unit.

What is claimed is:

1. An over-the-air (OTA) master configured to control a software update on electronic control units mounted on a vehicle, the electronic control units including a first electronic control unit and a second electronic control unit, the OTA master comprising:
   one or more first processors configured to:
      separately receive a first distribution package and a second distribution package, wherein
         the first distribution package is a distribution package of update data for the first electronic control unit with a non-volatile memory of a first type, the non-volatile memory of the first type including one storage area, and
         the second distribution package is a distribution package of update data for the second electronic control unit with a non-volatile memory of a second type, the non-volatile memory of the second type including two storage areas; and
      receive, from the center, the second distribution package before the first distribution package based on type information including information on a non-volatile memory type in the first electronic control unit and information on a non-volatile memory type in the second electronic control unit.

2. The OTA master according to claim 1, wherein the one or more first processors are configured to:
   transmit information based on the update data of the received first distribution package or the received second distribution package to an electronic control unit to be updated, in accordance with the type information.

3. The OTA master according to claim 2, further comprising:
   a storage configured to store the type information.

4. The OTA master according to claim 2, wherein the one or more first processors are configured to:
   transmit the information based on the update data for the second electronic control unit with the non-volatile memory of the second type preferentially over the information based on the update data for the first electronic control unit with the non-volatile memory of the first type to the electronic control unit to be updated, in accordance with the type information.

5. A vehicle comprising:
the OTA master according to claim 1;
a communication interface; and
a bus,
wherein the OTA master is configured to communicate with the center via a network through the bus and the communication interface.

6. The OTA master according to claim 1, wherein the information on the electronic control units is different from both the first distribution package and the second distribution package.

7. A center configured to communicate with an over-the-air (OTA) master, the OTA master being configured to control a software update on electronic control units mounted on a vehicle, the electronic control units including a first electronic control unit and a second electronic control unit, the center comprising:
a storage configured to store type information that indicates whether a non-volatile memory in the electronic control units is a non-volatile memory of a first type or a non-volatile memory of a second type; and
one or more first processors configured to:
separately generate a first distribution package and a second distribution package, wherein
the first distribution package is a distribution package of update data for the first electronic control unit with a non-volatile memory of the first type, the non-volatile memory of the first type including one storage area, and
the second distribution package is a distribution package of update data for the second electronic control unit with a non-volatile memory of the second type, the non-volatile memory of the second type including two storage areas; and
send, to the OTA master, the second distribution package before the first distribution package based on type information including information on a non-volatile memory type in the first electronic control unit and information on a non-volatile memory type in the second electronic control unit.

8. The center according to claim 7, further comprising:
a first communication module configured to send the first distribution package and the second distribution package to the OTA master in accordance with the type information.

9. The center according to claim 8, wherein the first communication module is configured to send the second distribution package to the OTA master before the first distribution package, in accordance with the type information.

10. The center according to claim 8, wherein the first communication module is configured to send the type information stored in the storage to the OTA master.

11. A system, comprising:
the center according to claim 7; and
the OTA master, wherein
the center includes a first communication module configured to send the first distribution package and the second distribution package to the OTA master, and
the OTA master includes a second communication module configured to receive the second distribution package before the first distribution package from the center.

12. The system according to claim 11, wherein the OTA master includes one or more second processors configured to:
transmit information based on the update data for the second electronic control unit with the non-volatile memory of the second type preferentially over information based on the update data for the first electronic control unit with the non-volatile memory of the first type to an electronic control unit to be updated, in accordance with the type information.

13. The system according to claim 12, wherein:
the center includes the storage configured to store the type information; and
the first communication module of the center is configured to send the type information to the OTA master.

14. A method that is performed by an over-the-air (OTA) master that controls a software update on electronic control units mounted on a vehicle, the electronic control units including a first electronic control unit and a second electronic control unit, the OTA master including one or more first processors and a memory, the method comprising:
separately receiving a first distribution package and a second distribution package, wherein
the first distribution package is a distribution package of update data for the first electronic control unit with a non-volatile memory of a first type, the non-volatile memory of the first type including one storage area, and
the second distribution package is a distribution package of update data for the second electronic control unit with a non-volatile memory of a second type, the non-volatile memory of the second type including two storage areas; and
receiving, from the center, the second distribution package before the first distribution package based on type information including information on a non-volatile memory type in the first electronic control unit and information on a non-volatile memory type in the second electronic control unit.

15. A non-transitory storage medium storing instructions that are executable by a computer of an over-the-air (OTA) master that controls a software update on electronic control units mounted on a vehicle, and that cause the computer to perform functions, the electronic control units including a first electronic control unit and a second electronic control unit, and the OTA master including one or more first processors and a memory, the functions comprising:
separately receiving a first distribution package and a second distribution package, wherein
the first distribution package is a distribution package of update data for the first electronic control unit with a non-volatile memory of a first type, the non-volatile memory of the first type including one storage area, and
the second distribution package is a distribution package of update data for the second electronic control unit with a non-volatile memory of a second type, the non-volatile memory of the second type including two storage areas; and
receiving, from the center, the second distribution package before the first distribution package based on type information including information on a non-volatile memory type in the first electronic control unit and information on a non-volatile memory type in the second electronic control unit.

* * * * *